2,902,448

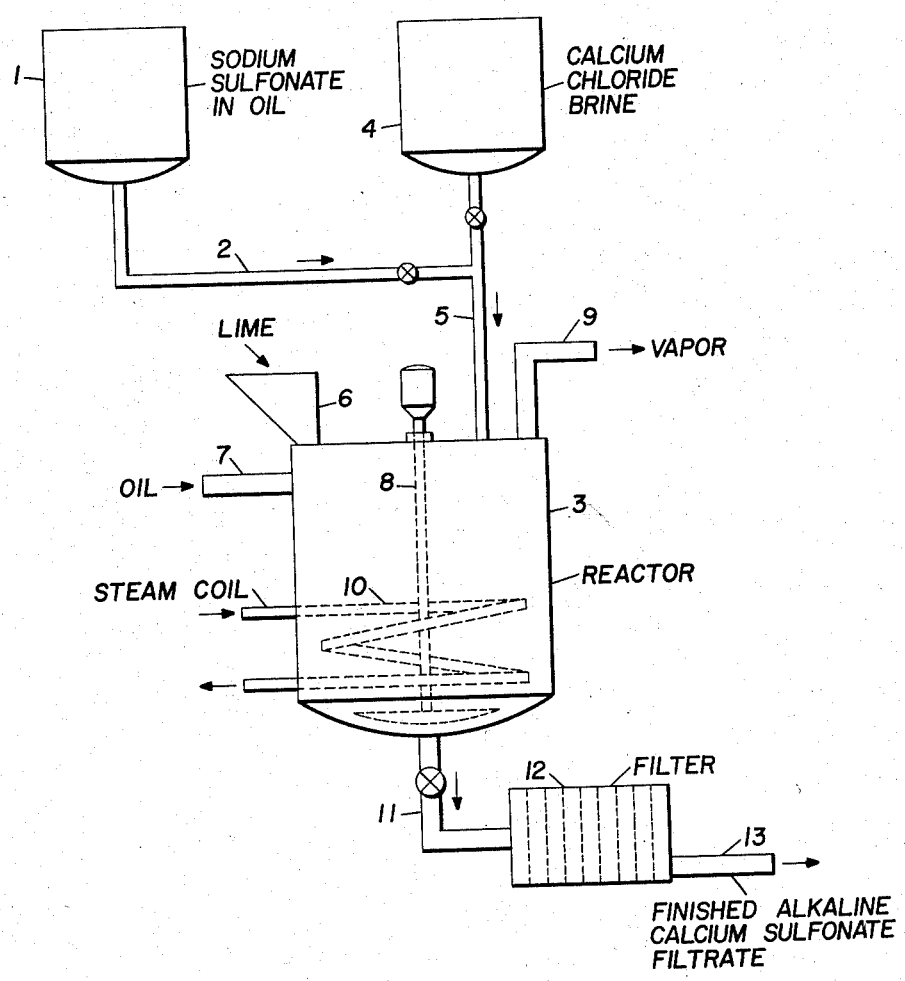

MANUFACTURE OF ORGANIC CALCIUM SULFONATES

John F. Collins, Elizabeth, N.J., assignor to Esso Research and Engineering Company, a corporation of Delaware Application July 20, 1955, Serial No. 523,164

2 Claims. (Cl. 252—33)

This invention relates to a process for the manufacture of oil-soluble basic calcium sulfonates from cyclic hydrocarbons such as are present in petroleum lubricating oil fractions or synthesized alkylated aromatic hydrocarbons. It is more specifically concerned with a process for preparing the basic calcium sulfonates by simultaneous reaction of the corresponding sodium sulfonates with a minimal amount of strong calcium chloride brine and dry calcium hydroxide.

By the present process a hydrocarbon lubricating oil solution of basic calcium sulfonates can be prepared in a single reaction vessel, with saving of calcium compounds used in the reaction, and with facilitation of the subsequent filtering operation. In contrast, a conventional method of forming calcium sulfonates involves transfer of materials to a number of vessels, more time consuming steps, use of amounts of aqueous salt solution, higher temperatures, and longer treating periods.

The sodium sulfonates utilized in the practice of this invention are the sodium salts of sulfonic acids represented by the following formula:

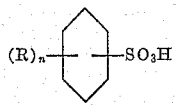

where (R) is one or more alkyl, alkaryl or aralkyl groups and the aromatic nucleus may be a single or condensed ring or a partially hydrogenated ring.

The simplified flow diagram in the drawing illustrates the important steps of the present invented process.

Referring to the drawing, a 50 wt. percent solution of sodium sulfonates in a petroleum lubricating oil fraction, is passed from vessel 1 by line 2 into the reactor 3. Calcium chloride brine of sufficiently high strength, 40% by weight of calcium chloride, is fed from vessel 4 by line 5 into the reactor 3. Dry calcium hydroxide is passed separately from the hopper line 6 into the reactor 3. Reactor 3 is provided with an inlet pipe 7 for addition of diluent oil, an agitator 8, and a vapor vent 9 for removing water vapor. The reactor 3 is also provided with a heat exchange coil 10 for controlling the temperature of the operation. The dehydrated reaction mixture is passed from reactor 3 through line 11 to filter 12, which may be a plate and a frame filter or any other well known type of filter. The finished oil solution of the basic calcium sulfonate as filtrate is withdrawn through line 13.

To demonstrate the advantages of the process, the following example is given:

EXAMPLE

Sodium sulfonates in oil, 50 wt. percent is admixed with about 1 to 1.2 moles of 40 wt. percent $CaCl_2$ brine and about 0.5 to 1.0 mole of dry $Ca(OH)_2$ per mole of the sulfonate. Diluent oil is admixed to form a 30 wt. percent sulfonate concentration in the oil in order to facilitate filtration. The mixture of the sulfonate oil solution and calcium compounds is agitated and heated from 30° C. to 150° C. in one hour to react and simultaneously dehydrate the product. Subsequently, about 0.6 wt. percent filter aid such as diatomaceous earth or acid treated clay is admixed and the product is filtered at about 150° C. to obtain a filtrate of the basic calcium sulfonate in oil solution.

Although the main advantages of the present invention are obtained through a single stage simultaneous reaction of the sodium sulfonates with the calcium chloride and lime properly proportioned, additional advantages are obtained from the introduction of the chemical materials into the reaction zone in a certain order. The preferred order is to add the diluent oil first to the reactor to wet the walls of the reaction zone chamber and thus prevent sticking or burning of the sodium sulfonate at heated surfaces within the reaction zone. Agitation is started as soon as the diluent oil is added. The strong calcium chloride brine is then added to the oil-diluted sulfonate solution being agitated. Next, the dry lime is added to the oil and brine mixture. When all the components have been added, heat input of the reactor is increased and the temperature of the reaction mixture is raised from about 30° to 150° C. In this manner sticking or burning of the charge is prevented and it is unnecessary to use excessively high temperatures for completing the reaction, including dehydration.

In a known conventional 2-stage type of process for preparing calcium sulfonates, 50 wt. percent of the corresponding sodium sulfonates in oil is first mixed with 2.5 moles of 22 wt. percent $CaCl_2$ brine per mole of sulfonate at 90° C. for 15 minutes and settled hot for at least 3 hours in order to separate the spent brine which is discarded. This large excess of brine was found essential in the 2-stage type process to insure adequate conversion of the sodium sulfonates to calcium sulfonates prior to intermediate separation of surplus brine which is to be followed by a liming reaction.

Emulsions are formed in the operation which uses high excess of aqueous calcium chloride; and they give difficulty in settling out the spent brine after the conversion. Some of the upper layer crude calcium sulfonates may tend to be entrained in the spent brine and this gives rise to a loss of product in the discarded spent brine. The upper layer crude calcium sulfonates, which normally contains 15 wt. percent of residual spent mixed sodium and calcium chloride brine, is diluted with oil to give 30 wt. percent sulfonates in oil concentration. Then, dry $Ca(OH)_2$ is admixed with the crude calcium sulfonates to provide a small amount of calcium in addition to that present from the excess calcium chloride, and the limed mixture is agitated and heated to an elevated temperature to react and dehydrate the basic calcium sulfonates. It is to be noted that the thus described 2-stage reaction method is time consuming and requires excess calcium chemicals principally in the form of calcium chlorides. The finished product quality is variable on account of the uncertain composition of the crude calcium sulfonates.

In the process of the present invention, the strong calcium chloride brine used is helpful in reducing the amount of water which has to be removed during the hydration. These high calcium chloride concentrations in the aqueous solution may be of the order of 30 to 40 wt. percent, and preferably 40 wt. percent. In using 1 to 1.2 moles of $CaCl_2$/mole Na sulfonates, the excess of $CaCl_2$ is only 0 to 3.3 wt. percent. The lime admixed then being 3.9 to 7.8 wt. percent or more is higher in quantity than the excess lime. With the process of the present invention, a settling period may be used before a final dehydration to bring about a break between the aqueous brine and the oil solution to separate some aqueous brine but this is time consuming. It has been found that even without such a separation, the solid sodium chloride salt particles formed as a byproduct in the conversion remain in such large particle size at the end of the dehydration that they can be easily passed in the subsequent filtration. These larger salt particles may even aid in the rate of filtration without contaminating the filtrate because there is a high conversion of the sodium sulfonates to the corresponding calcium sulfonates with the simultaneous lime operation. High alkalinity is realized even with addition of relatively small amounts of calcium compounds. Higher alkalinity may be obtained if desired, but it has been demonstrated that with minimum amounts of the calcium chloride brine and dry lime used, the finished product has satisfactory high alkalinity. The outstanding advantages of the present invention process in which the conversion of calcium sulfonates and liming is carried out simultaneously compared with the type of 2-stage procedure described are shown in the following table:

Table I
COMPARISON OF PRESENT SINGLE-STAGE REACTION METHOD WITH 2-STAGE REACTION METHOD

|  | Single-Stage Method | 2-Stage Reaction Method |
|---|---|---|
| Wt. percent $H_2O$ to be removed by dehydration on a 30 wt. percent sulfonate basis | 6.24 | 8.6 |
| Typical average molecular wt. of calcium sulfonates | 928 | 928 |
| Moles of $CaCl_2$ used | 1.2 | 2.5 |
| Moles of $Ca(OH)_2$ used | 0.5 | 1.0 |
| Comparative filtration rate of finished product 30 wt. percent calcium sulfonates | 1 Min.=76 ml. 2 Min.=106 ml. 3 Min.=140 ml. 4 Min.=161 ml. 5 Min.=179 ml. | 1 Min.=38 ml. 2 Min.=68 ml. 3 Min.=87 ml. 4 Min.=104 ml. 5 Min.=114 ml. |

The data shown in Table I are for illustrative purposes only. Increased lime was used for comparative purposes in the 2-stage reaction, i.e. to obtain equal conversion of Na to Ca sulfonates.

It is to be noted that in using only 1 to 1.2 moles of $CaCl_2$ per mole of sodium sulfonates and at the same time using at least 0.5 moles dry lime a complete conversion of the sodium to the corresponding calcium sulfonates is obtained and at the same time the alkalinity of the resulting finished product is raised to 13.8 mgm. KOH/gm. In the resulting product very little calcium chloride remains to give difficulties in filtration on account of the solubility of the salt at the operating temperature. By contrast, in using large excess amounts of calcium chloride first to obtain a conversion and separation of brine before adding any lime and then adding lime to the remaining oil solution which retains excess calcium chloride a relatively low alkalinity is obtained in the finished product. For example, using 50 to 100% excess calcium chloride in a first stage conversion of sodium sulfonates and using 1.5 weight percent lime on the oil solution after separating spent brine the alkalinity of the finished product amounts to 2 or 3.

Additional advantages obtained in the simultaneous conversion and liming operation are in the saving of handling of materials, saving of steam or heat input for dehydration, increased rate of production and more uniform product quality.

The U.S. Patent 2,467,176 of Zimmer et al. describes a 2-stage type process in which larger amounts of dilute aqueous $CaCl_2$ is reacted with the sodium sulfonates in a first stage and smaller amounts of lime are reacted with the sulfonates after separating spent aqueous solution. The relative amounts of chemicals used in such a 2-stage process compared with the 1-stage process of the present invention are illustrated in the following Table II.

Table II

| Process | Present 1-stage | | |
|---|---|---|---|
|  | Moles | Wt. Percent | Wt. Percent Excess |
| Chemicals: |  |  |  |
| $CaCl_2$ | 1 to 1.2 | 11.9 to 14.2 | 0 to 3.3 |
| $Ca(OH)_2$ | 0.5 to 1 | 3.9 to 7.8 | None |

| Process | 2-Stage Process | | |
|---|---|---|---|
|  | Moles | Wt. Percent | Wt. Percent Excess |
| Chemicals: |  |  |  |
| $CaCl_2$ | 1.5 to 2 | 17.8 to 23.8 | 5.9 to 11.9 |
| $Ca(OH)_2$ | 0.19 | 1.5 | None |

It will be understood that the process of the present invention applies to the treatment of the same kinds of sulfonic acids and mineral lubricating oils as shown in U.S. 2,467,176 but with specific differences designated particularly with respect to the use of more concentrated $CaCl_2$ in lower amount and more lime in one reaction stage.

The invention described is claimed as follows:

1. In a process of producing a hydrocarbon oil solution of basic calcium hydrocarbon sulfonates, the improvement which comprises simultaneously reacting a 30 to 50 wt. percent solution of sodium sulfonates in oil with admixed calcium chloride brine having a calcium chloride concentration of about 30 to 40 wt. percent in a ratio of about 1.0 to 1.2 moles calcium chloride per mole of sodium sulfonates and dry calcium hydrodixe in a ratio of 0.5 to 1.0 moles of calcium hydroxide per mole of sodium sulfonates at a temperature in the range of about 30° to 150° C. until the conversion of sodium sulfonates to basic calcium sulfonates is substantially complete and the resulting mixture is substantially dehydrated, and filtering the resulting mixture containing precipitated sodium chloride to obtain a filtrate of basic calcium sulfonates in hydrocarbon oil solution.

2. In the manufacture of a hydrocarbon oil solution of basic calcium sulfonates of high alkalinity, the improvement which comprises diluting about 50 wt. percent oil soluble sodium sulfonates with hydrocarbon oil to form about a 30 wt. percent solution of sodium sulfonates in the hydrocarbon oil in a reaction zone, adding to said diluted solution a calcium chloride brine having a calcium chloride concentration of about 30 to 40 wt. percent in a ratio of about 1.0 to 1.2 moles of calcium chloride per mole of sodium sulfonates in said diluted solution and at least 0.5 moles of dry calcium hydroxide per mole of sodium sulfonates in said diluted solution, agitating the resulting mixture in the reaction zone while it is heated to temperatures in the range of 30° to 150° C., continuing the heating of the mixture until it is substantially freed of water, admixing the resulting calcium sulfonate oil solution containing precipitated sodium chloride with a filter aid, and filtering the mixture at a temperature of about 150° C. to obtain a filtrate of about 30 wt. percent basic calcium sulfonates in hydrocarbon oil solution freed of the chloride.

References Cited in the file of this patent

UNITED STATES PATENTS

| | | |
|---|---|---|
| 2,395,713 | Barbour | Feb. 26, 1946 |
| 2,465,221 | Gilbert | Mar. 22, 1949 |
| 2,514,733 | Vold et al. | July 11, 1950 |
| 2,708,182 | John | May 10, 1955 |
| 2,738,326 | Anderson et al. | Mar. 13, 1956 |